United States Patent
Tobler et al.

(10) Patent No.: US 7,380,890 B2
(45) Date of Patent: Jun. 3, 2008

(54) SYSTEM FOR CONTROLLING BRAKE PULSING AT VEHICLE NATURAL VIBRATION FREQUENCIES

(75) Inventors: Bill Tobler, Willis, MI (US); Michael Tiller, Canton, MI (US); Paul Bowles, Grosse Ile, MI (US)

(73) Assignee: Ford Global Technologies LLC, Dearborn, MI (US)

( * ) Notice: Subject to any disclaimer, the term of this patent is extended or adjusted under 35 U.S.C. 154(b) by 280 days.

(21) Appl. No.: 10/780,301

(22) Filed: Feb. 17, 2004

(65) Prior Publication Data

US 2005/0179316 A1 Aug. 18, 2005

(51) Int. Cl.
  B60T 8/74 (2006.01)
  B60B 39/00 (2006.01)
(52) U.S. Cl. .......... 303/176; 303/3; 303/191; 701/71
(58) Field of Classification Search .......... 303/3, 303/121, 138, 145, 176, 191, DIG. 1, DIG. 2, 303/155; 701/71, 78
See application file for complete search history.

(56) References Cited

U.S. PATENT DOCUMENTS

| | | | |
|---|---|---|---|
| 5,495,912 A | 3/1996 | Gray, Jr. et al. | |
| 5,948,036 A * | 9/1999 | Okubo | 701/78 |
| 6,122,584 A * | 9/2000 | Lin et al. | 701/70 |
| 6,176,808 B1 | 1/2001 | Brown et al. | |
| 6,364,807 B1 | 4/2002 | Koneda et al. | |
| 6,508,739 B1 | 1/2003 | Bellinger | |
| 2002/0066607 A1 | 6/2002 | Levin | |
| 2003/0001390 A1 | 1/2003 | Phillips et al. | |
| 2003/0004031 A1 | 1/2003 | Phillips et al. | |
| 2003/0006076 A1 | 1/2003 | Tamor | |

\* cited by examiner

*Primary Examiner*—Melody M Burch
(74) *Attorney, Agent, or Firm*—David Kelley, Esq.; Tung & Associates

(57) ABSTRACT

A system is provided for controlling automatic brake systems to avoid pulsing vehicle brakes at certain natural vibration frequencies of the vehicle's mechanical systems such as a powertrain and driveline. The natural vibration frequencies of the vehicle's systems are determined and correlated with a range of possible braking regimes implemented by an on-board automatic brake control, such as an anti-lock braking (ABS) system. A proposed, normally appropriate ABS braking response to a sudden braking condition is either modified, accelerated or delayed when the proposed response is deemed likely to excite a vehicle natural frequency. The system improves ABS operation in vehicles having high effective inertia powertrains, such as those used in hybrid electric vehicles.

19 Claims, 4 Drawing Sheets

SYSTEM FOR CONTROLLING BRAKE PULSING AT VEHICLE NATURAL VIBRATION FREQUENCIES

FIELD OF THE INVENTION

This invention generally relates to vehicle powertrains and anti-lock braking systems (ABS), and deals more particularly with a system for controlling operation of the ABS in a manner that avoids excitation of the vehicle's natural vibration frequencies.

BACKGROUND OF THE INVENTION

Environmental concerns and the need for fuel conservation has spurred the development of new hybrid propulsion systems for vehicles. Hybrid electric vehicle (HEV) powertrains for example, typically include electric traction motors, high voltage electric energy storage systems, and modified transmissions. Electric energy storage systems include batteries and ultra capacitors. Primary power units for these systems may include spark ignition engines, compression ignition direct injection (e.g., diesel) engines, gas turbines and fuel cells.

HEV powertrains are typically arranged in series, parallel or parallel-series configurations. With parallel-series arrangements, multiple motors operating in multiple operating modes sometimes require the use of several gear sets to effectively transmit power to the traction wheels. As a result, HEV powertrains often possess considerable effective inertia at the wheels compared to conventional ICE powertrains. This is due in part to the potentially large inertia of the hybrid motor devices, as well as the significant gearing from motor to wheels that is often employed.

Powertrains possessing relatively high effective inertias such as those of HEVs, result in certain problems that require solutions. For example, the application of braking force to the vehicle's traction wheels during a sudden braking event, may result in a very rapid angular momentum change in the powertrain. Specifically, a rapid deceleration of the traction wheels during braking results in a counter-torque being transmitted from the traction wheels back through the driveline. Because many of the components connected in the driveline have relatively large effective inertias at the wheels, the counter-torque produced by the braking event can produce relatively high reactive torque levels in the powertrain. This reaction torque is transmitted through the gearing mechanisms to the transmission housing, and can have deleterious effects on powertrain and driveline components, particularly under sudden conditions, such as when the vehicle's ABS system is activated.

The problems described above can be exacerbated by automated control of the vehicle's braking system, as occurs when the vehicle's ABS is actuated, since the ABS is capable of cycling or "pulsing" the brakes at a frequency much higher than the driver. Because of the large inertia of the HEV's powertrain and highly geared electric motor, pulsing the brakes can excite the natural vibration frequencies of the vehicle or certain of its mechanical subsystems, such as the driveline and powertrain. For example, ABS excitation at certain frequencies can excite the roll mode of the engine block and transmission case on the engine mounts. Depending on the mounting configuration, excitation of this roll mode can also excite engine block modes such as fore/aft or lateral motion. The excitation described above can occur for either of two reasons. First, the large inertias and high gear ratios characteristic of HEV's shift some of the natural frequencies down to a range where they can be excited by the ABS. Second, the ability of the braking system to excite additional modes may be amplified because of the large inertias and high gear ratios. ABS excitation of the natural frequencies of the vehicle's mechanical systems can impose undesirable levels of stress on driveline and powertrain components, increasing the likelihood of noise, vibration, harshness, and even component degradation.

Accordingly, there is a need in the art for a system for avoiding or reducing pulsing of a vehicle's brakes at certain natural frequencies of the vehicle's mechanical components and subsystems. The present invention is intended to satisfy this need.

SUMMARY OF THE INVENTION

One significant advantage of the present invention resides in a system for controlling inertial forces within a vehicle powertrain and driveline during certain operating conditions, such as sudden braking, when the vehicle's ABS system is actuated. The inventive control system reduces or eliminates these inertial forces by preventing the ABS from pulsing the vehicle's brakes at certain natural frequencies of the vehicle. An important advantage of the invention is that control of ABS pulsing is achieved using a simple control strategy that does not require substantial additional hardware or modification of the vehicle's mechanical components. Another advantage of the system is that, in addition to reducing stress on powertrain and driveline components, the effectiveness of the ABS increased under certain conditions.

In accordance with one embodiment of the invention, a method is provided for controlling an anti-lock braking system employed in a vehicle having a high inertia powertrain, to avoid excitation of the vehicle's natural frequencies. The method comprises determining the natural vibration frequencies of the vehicle, selecting a normally appropriate ABS response to a sudden braking event, and altering the selected ABS response to avoid exciting at least certain of the natural frequencies.

According to another aspect of the invention, a system is provided for controlling an anti-lock braking system (ABS) to avoid exciting a natural vibration frequency of a vehicle. The system broadly includes: a memory for storing a set of vehicle natural frequencies that may be excited by the ABS, and for storing a set of possible ABS responses to driving conditions requiring actuation of the vehicle's ABS; and, a set of programmed instructions for comparing a proposed ABS response with each of the natural frequencies stored in the memory.

These and other features and advantages of the present invention may be better understood by considering the following details of a description of a preferred embodiment of the invention. In the course of this description, reference will frequently be made to the attached drawings.

DETAILED DESCRIPTION OF THE PREFERRED EMBODIMENT

Figure 4:
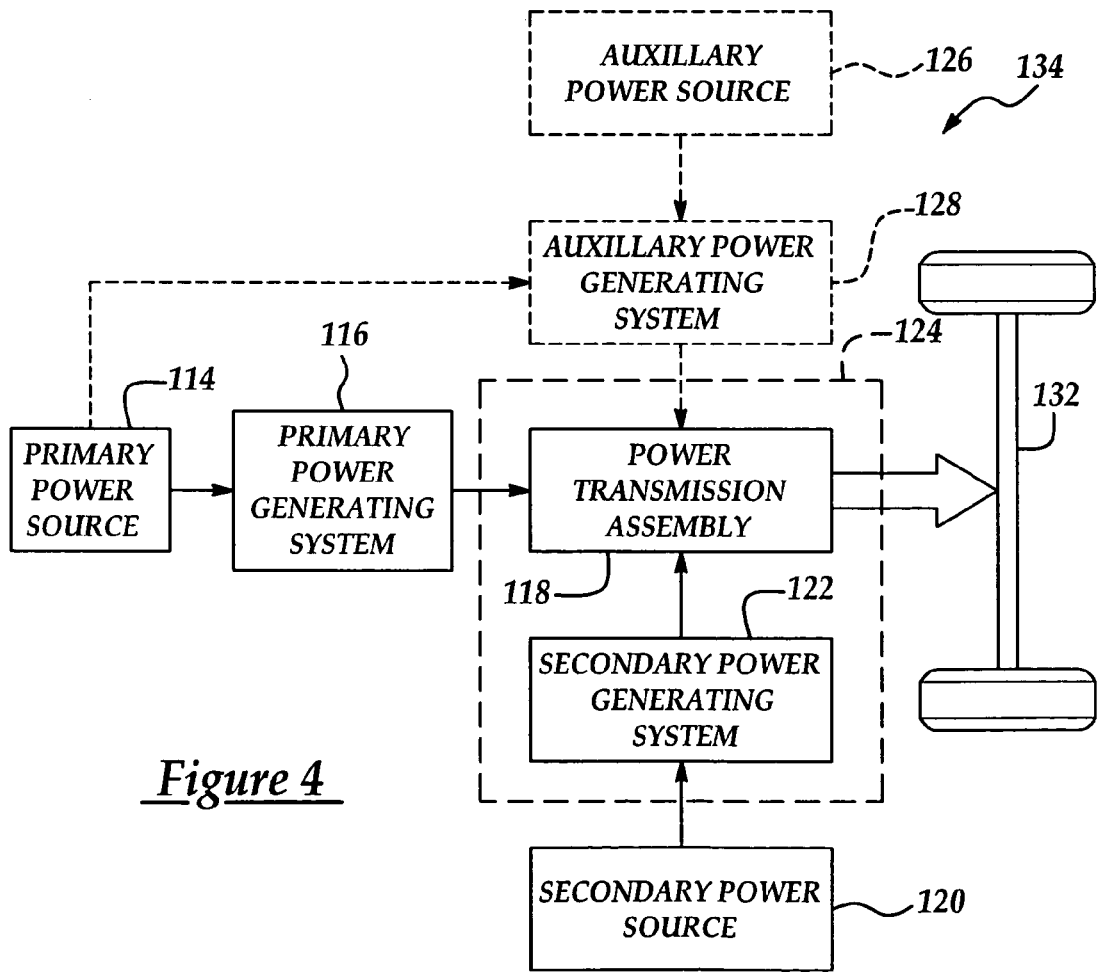
FIG. 4 is a block diagram of a generic architecture for a hybrid vehicle system; and, FIGS. 5A-5C are block diagrams showing exemplary hybrid powertrain system configurations.

FIG. 4 shows a generic architecture for a hybrid vehicle system 134, to which the present invention may be applied. The system 134 includes a primary power source 114, such as a gasoline, diesel or other gas fuel supply, coupled to a primary power generating system 116, such as an internal combustion engine. The primary power generating system 116 generates a primary drive torque that is transmitted to the vehicle's driveline 132 via power transmission assembly 118. The power transmission assembly 118 can be a conventional manual, automatic or continuously variable automotive transmission, or other equivalent gearing mechanism for transmitting mechanical power produced by the primary power generating system 116. The system 134 further includes a secondary power source 120, such as a battery, ultracapacitor, hydraulic accumulator or other energy storage device, and secondary power generating system 122, such as one or more electric machines or other torque generating devices, for supplementing the drive torque delivered by the primary power generating system 116. The system may further include an auxiliary power source 126 coupled to an auxiliary power generating system 128, such as a fuel cell system or Auxiliary Power Unit (APU) for providing additional drive torque.

The primary power generating system 116 may, for example, be a gasoline, natural gas, hydrogen or other gaseous, fuel-burning internal combustion engine. Power transmission assembly 118 transmits the output of both the internal combustion engine 116 and the secondary power generating system 122 to the vehicle driveline 132. The power transmission assembly 118 may be a converter-less automatic transmission constructed and arranged with the secondary power generating system 122, such as an integrated high voltage electric motor/generator. The power transmission assembly 118 and secondary generating system 120 can be packaged into a single modular hybrid transmission unit 124.

Figure 5A:
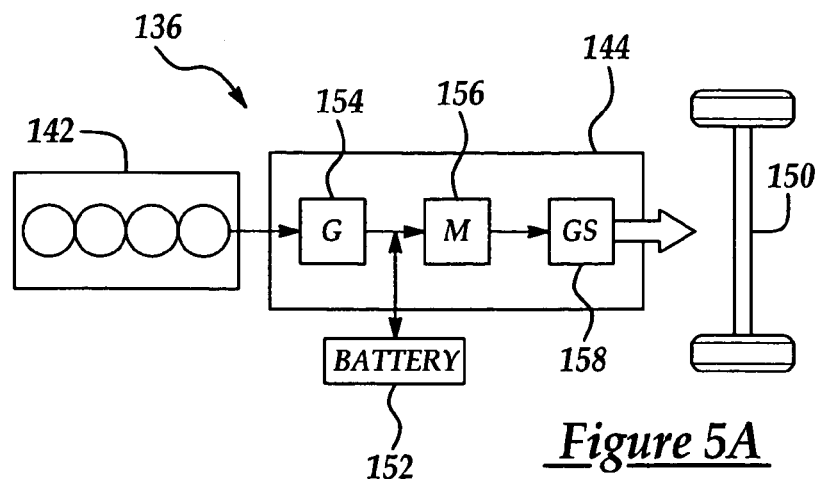
Figure 5B:
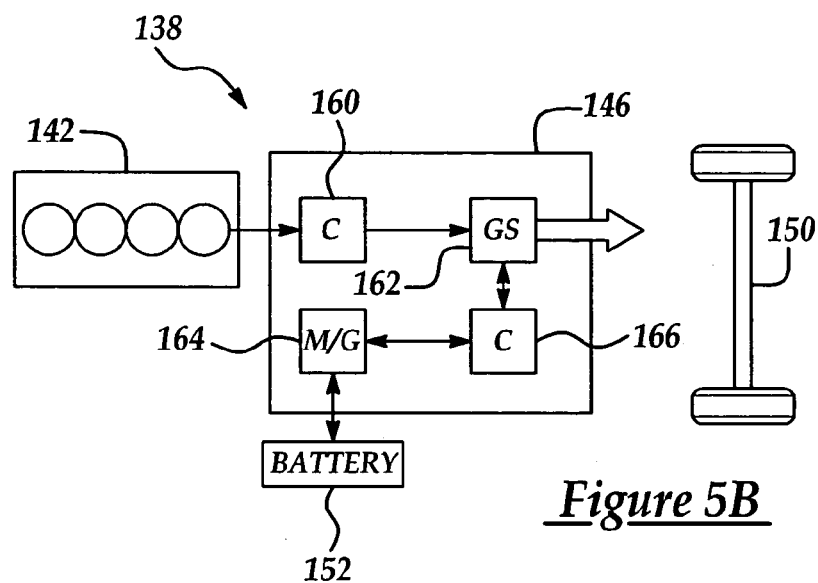
Figure 5C:
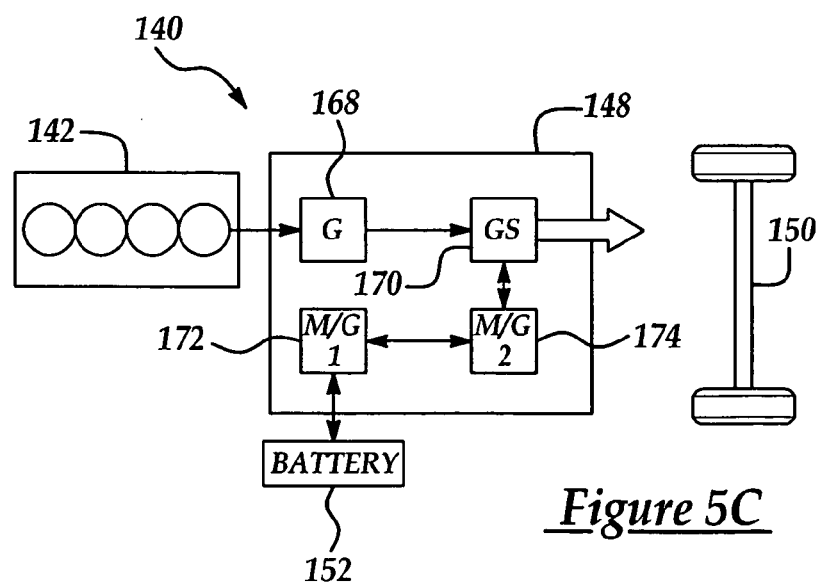

FIGS. 5A through 5C show exemplary hybrid powertrain system configurations that may be used to implement the present invention. The systems shown in FIGS. 5A-5C are shown by way of example and not limitation.

FIG. 5A depicts a so-called "series" hybrid configuration 136 having an internal combustion engine 142 coupled to a modular hybrid transmission unit 144. Modular hybrid transmission unit 144 includes an electric generator 154 that produces electrical energy for powering the vehicle drive wheels 150 via an electric motor 156 and gear set 158. Electrical storage device 152 stores electrical energy via the generator 154 when the internal combustion engine produces more power than required, and supplements engine power via the electric motor when power demand exceeds the engine power output. FIG. 5B show a so-called "parallel" hybrid configuration 138 wherein modular hybrid transmission unit 46 delivers driveline torque via a first power path having the internal combustion engine 142, a coupling device 160 and a gear set 162. The coupling devices 160, can be any suitable devices, for example a gear set or clutch, for transmitting mechanical energy to the vehicle driveline 160. The coupling devices 160, 166 can be the same device. FIG. 5C shows a so-called "parallel-series" configuration 140 wherein a modular hybrid transmission unit 148 includes motor/generators 172, 174 electrically and/or mechanically coupled, for example via planetary gearset, to deliver power to a gearset 170 and driveline 150.

Figure 1:
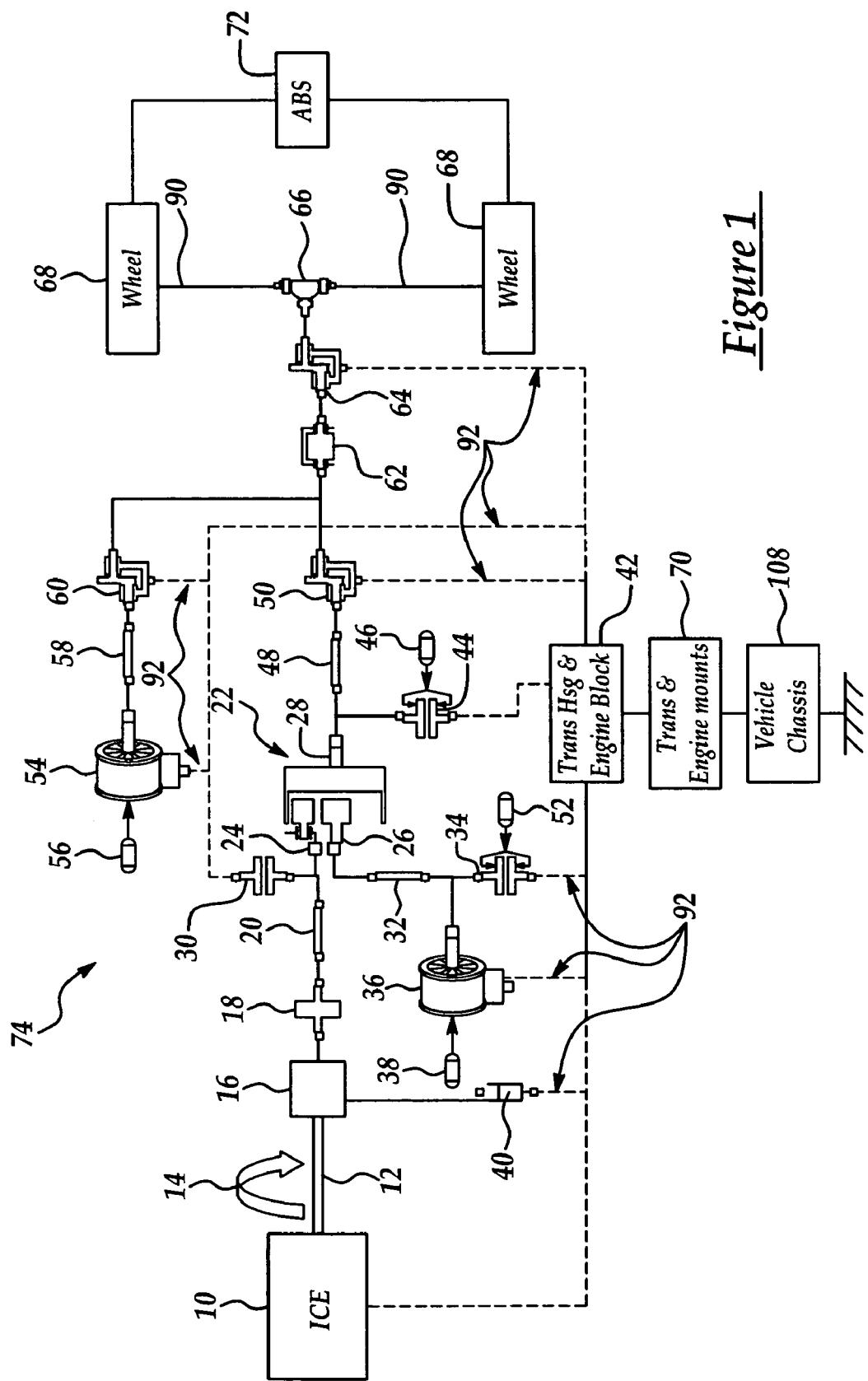
FIG. 1 is a combined block and diagrammatic view of a powertrain for a parallel-series type hybrid electric vehicle equipped with an ABS.

Referring now to FIG. 1, a high effective inertia powertrain 74 for driving a vehicle is depicted. In the illustrated embodiment, the powertrain 74 is suitable for use in an HEV utilizing one or more fuel and/or motor drives. As shown, the powertrain 74 includes an internal combustion engine (ICE) 10 and a DC electric motor 54, each connected through a later-described driveline to drive a pair of traction wheels 68, sometimes also referred to as drive wheels. The engine 10 has a crankshaft 12 rotating in the direction of arrow 14, which is connected to the driveline by a damper coupling 16. The rotating friction of the engine 10 is schematically indicated by the damper 40. Torque is transmitted by the damper coupling 16 through a rigid or compliant shaft 20 to a planetary gear set 22. A damper 18 between the damper coupling 16 and the shaft 20 functions to isolate torsional fluctuations transmitted from the engine 10 to the transmission line. The planetary gear set 22 includes a carrier gear 24 and sun gear 26 driving a ring gear 28. A one-way clutch 30 connected between the carrier gear 24 and a transaxle housing 42 functions to prevent the engine 10 from rotating in a reverse direction. The transaxle housing 42 encases transmission and differential components. The mechanical mounting or connection of these various components is schematically represented by the various broken lines 92 connecting these components to transaxle housing and engine block 42. The sun gear 26 is connected through an output shaft 32 of an electric motor generator 36 whose speed is controlled by a torque control signal delivered to its control input 38.

Although not specifically shown, it should be noted that the motor 54 and generator 36 are connected with one or more suitable energy storage systems. The speed of the carrier gear 24 and the engine 10 is a function of the speeds of the ring gear 28 and the sun gear 26. Thus, generator 36 is used to control the speed of the engine 10 by changing the speed of the sun gear 26. The use of the generator 36 to control the speed of the engine 10 may be used in an intelligent control system to control engine speed independent of driveline speed. A clutch 34 operated by a control signal at its input 52 functions to selectively lock the generator 36 against rotation. Locking the generator 36 prevents the sun gear 26 from rotating, the result of which is the planetary gear 22 directly connects the engine 10 to the traction wheels 68.

Ring gear 28 is connected through counter shaft 48 and gear assemblies 50, 64 to a torque splitting device in the form of a differential 66. A parking brake 44 actuated by control signal at its input 46 is connected to and selectively locks the countershaft 48 against rotation. Gear assemblies 50, 64 possess inertia represented by the numeral 62. The differential 66 splits the driveline torque and delivers it through a pair of half shafts 88, 90 respectively to the traction wheels 68.

A second power source for driving traction wheels 68 is provided by the DC electric motor 54 whose speed is determined by a torque control signal received at its input 56. Motor 54 provides the dual function of driving the traction wheels 68 and acting as a regenerative braking generator. During vehicle braking, the motor 54 functions as an electrical generator using kinetic energy of the vehicle to generate electricity that is stored in a battery (not shown) for later use. The motor 54 delivers torque at its output shaft 58 through a gear set 60 to the differential 66, which in turn transmits the torque to the traction wheels 68. The motor 54 possesses a relatively high effective inertia at the wheels, compared to an conventional ICE powered vehicle, due in part to its own inertia as well as that of the gear assemblies 60 and 64.

The powertrain 74 described above possesses a relatively high amount of effective rotating inertia at the wheels, compared to the powertrain of a conventional ICE powered vehicle. This relatively high amount of effective rotating inertia is partially due to the use of multiple drive motors, motor controls and gear sets that are necessary to manage the delivery of power to the traction wheels 68. A major portion of this inertia is attributable to the electric motor 54 and the gear sets 60 and 64 that mechanically connect it to the traction wheels 68. The gear sets 22 and 50 also materially contribute to the effective powertrain inertia, as does the ICE 10 and the generator 36. The various component parts of the powertrain 74 are mechanically connected either directly or indirectly to a transaxle housing and ICE engine block 42. The transaxle housing and engine block 42 are in turn carried on corresponding transaxle and engine block mounts 70 that are secured to the vehicle's chassis 108. Thus, numerous components, including gear assemblies transmit torque to mountings on the transaxle housing and engine block 42, which in turn transfer this torque to the mounts 70.

In the event of a sudden braking event, as occurs during a sudden where the vehicle's ABS system is actuated, the braking force applied to the traction wheels 68 causes rapid deceleration of these wheels, in turn resulting in a rapid deceleration of the powertrain that is mechanically connected to the wheels 68. This rapid deceleration of the powertrain, which has a large effective inertia, produces a commensurately large counter-torque which is transferred back through the driveline and powertrain 74. This counter-torque is transmitted to each of the powertrain components where it is applied to the transaxle housing and engine block 42, and their mounts 70. The reactive forces on the transaxle housing and engine block 42, as well as their chassis mounts 70 are particularly high because of the large effective rotating inertia of the powertrain 74. As a result, the reactive forces applied to the transaxle housing and block 42, and the mounts 70 may be sufficient to damage these components under certain sudden braking conditions. Even under normal braking conditions the relatively high powertrain inertia and torque levels can produce undesirable noise, vibration and harshness (NVH). Furthermore, large fluctuating torques in the powertrain can affect the performance of the ABS system.

The problems described immediately above can be even more severe when the vehicle's braking system is actuated in a pulse-like mode, either as a result of the driver rhythmically "pumping" the brakes, or due to activation of the ABS 72 which automatically pulses the brakes at one or more frequencies dictated by fixed or dynamic braking algorithms forming part of the ABS. Pulsing of the vehicle brakes results in pulses of reactive torque being transmitted from the wheels 68 back through the powertrain 74 to the transmission housing and engine block 42, and their mounts 70. These pulses of reactive torque are, in effect, amplified if the pulse rate is at or near the natural frequency of the powertrain 74, the driveline or any of their component parts. The amplified pulses of reactive torque transmitted back through the powertrain 74 set up reactive forces that can rock powertrain components on their mountings and impose extraordinary forces on powertrain and driveline components, causing NVH and possible degradation of the driveline components. Moreover, the pulses of reactive torque transmitted back through the powertrain may adversely affect operation of the ABS.

Figure 2:
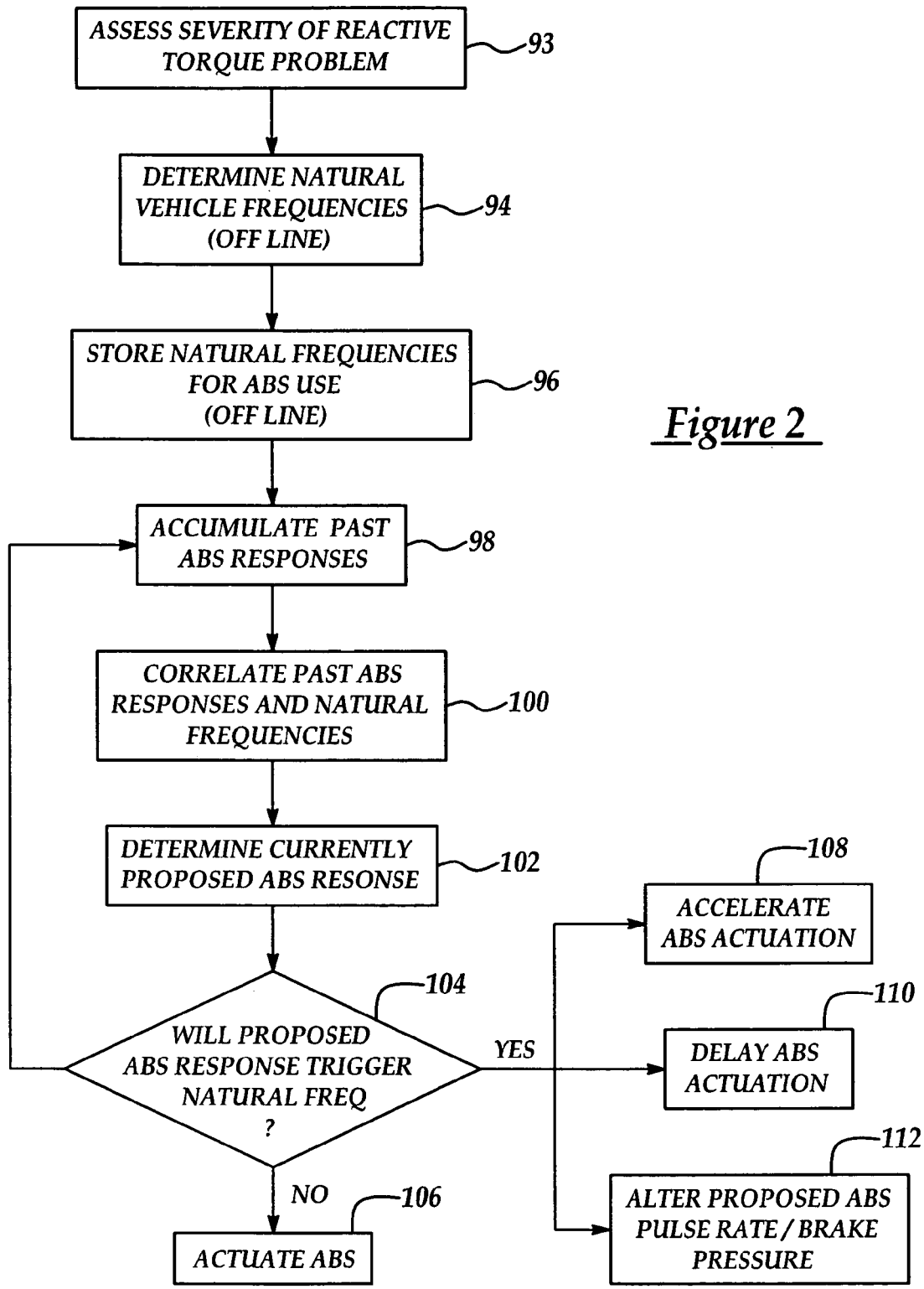
FIG. 2 is flowchart showing the steps employed in carrying out the control method of the present invention.

In accordance with the present invention, excitation of the vehicle's natural frequencies induced by pulsed braking can be reduced by altering the normal operation of the ABS in a manner that takes these natural frequencies into consideration. Referring to FIG. 2, the first step 93 in the inventive method involves determining, during the vehicle design stage, the potential severity of the reactive torque problem. This can be accomplished using a variety of techniques and tools. For example, measurements may be made of driver seat track acceleration or acoustic measurements may be taken to determine if the measured effects of reactive torque exceed a threshold suggesting that remedial measures should be considered. Assuming that such measures are warranted, the next step 94 consists of determining the natural frequencies of the vehicle and its components which may result in undesirable levels of stress or force being imposed on the powertrain 74 and driveline components. This may comprise a single frequency, but depending on the powertrain configuration and application, several natural frequencies may exist. These natural frequencies may be determined by mathematical modeling or through experimental testing, or a combination of both wherein the results of modeling are verified by vehicle testing.

Next, in step 96, the vehicle's natural frequencies are recorded or stored in a memory (not shown), such as an existing memory of the ABS control system. Steps 94 and 96 are normally performed "off-line", i.e., carried out before or during installation and set up of the control system in the vehicle. However, it should be pointed out that these two steps could, if desired, be performed "on-line" in the vehicle after the control system is installed. For example, an on-board DSP (digital system processing) system could be used to determine the natural frequencies while the vehicle is operating.

In step 98, the responses of the ABS system to a series of sudden braking events is accumulated and recorded, as in an on-board memory which again may be an existing memory in the ABS control system. These ABS responses include various combinations of brake pressures and pulsing frequencies to avoid brake lock up and maximize braking effectiveness. Brake pressure and wheels speed during sudden braking events are specifically monitored as part of the process of accumulating ABS responses. Not all natural frequencies of the vehicle necessarily interact with the ABS 72, consequently, as shown in step 100, a correlation is made between the ABS responses recorded in step 98 and the natural frequencies recorded in step 96. Certain combinations of braking responses infer that the ABS 72 is producing reactive torque at frequencies that are at or near the vehicle natural frequencies, and that braking effectiveness has been reduced. The correlation step 100 therefore establishes which of the ABS responses results in the ABS 72 "participating" in the recorded natural frequencies.

At this point, it is known which of the vehicle's natural frequencies may be amplified by various actions taken by the ABS 72, consequently steps can be taken to avoid ABS actuation when it is likely that the effects of ABS actuation will result in its participation in vehicle natural frequencies. At step 102, when an event occurs that would normally call for actuation of the ABS 72, the proposed response by the ABS 72 is specifically determined, and then at step 104, a determination is made as to whether the proposed ABS response is likely to result in participation in any of the natural frequencies stored in step 96. If it is not likely that an ABS response will participate in a stored natural frequency, then the ABS 72 is actuated in the normal manner as shown at step 106. If however, it is determined that a proposed response stored natural frequency is likely to be excited by the proposed ABS response, then any of several actions may be taken. First, as shown at step 108, the proposed ABS response may be initiated sooner (accelerated) than normally planned. Alternatively, as shown at step 110, the proposed ABS response may be delayed. Finally, the proposed ABS response may be altered as shown at step 112. The alteration of the proposed ABS response may consist of changing the pulse rate or the applied brake pressure, or changing other parameters of the proposed response that would avoid exciting any of the stored natural frequencies.

Figure 3:
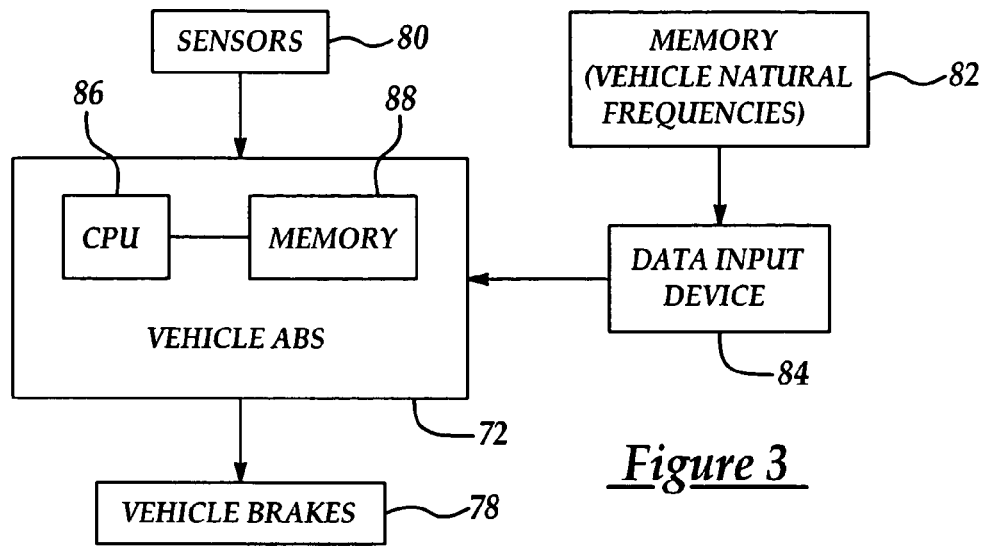
FIG. 3 is a simplified block diagram showing the control system of the present invention.

The control method described above may be implemented by a variety of hardware, firmware and software combinations, depending on the exact application. In one simple form, the method can be largely implemented using the existing components of the ABS system with slight modifications, and in this connection reference is now made to FIG. 3. A typical ABS system 72 includes one or more on-board, programmed computers having one or more memories 88 and a CPU 86 to control system operations, and data transfer. The memory 88 may comprise one or more ROMs or RAMs in which instructions or data, including system operating algorithms, are temporarily or permanently stored. Also, the data and programmed instructions required to implement the present control system may be stored in partitioned portions of a single memory. The ABS 72 typically receives data from a variety of on-board sensors 80 that sense the occurrence or likelihood of a driving event requiring actuation of the ABS to automatically control the vehicle's brakes 78.

As previously stated, the natural frequencies of the vehicle and its mechanical systems may be acquired using a variety of methods, including mathematical modeling and testing. This natural frequency data may be stored in an off-board memory 82 and loaded into one of the on-board memories 88 using a data input device 84 connected to the ABS 72. One of the memories 88 contains a learning program which relates past responses of the ABS 72 to each of the natural frequencies that have been loaded from memory 82. Longer response times or stopping distances suggest that the ABS 72 is pulsing the brakes 78 at a natural frequency that impairs normal ABS operation. This leaning regime is necessary because ABS pulsing at certain of the stored natural vehicle frequencies may not appreciably impair ABS operation. Upon completion of the learning phase, the modified data set stored in the 88 comprises all of those vehicle natural frequencies at which ABS pulsing should be avoided.

The program stored in memory 88 then monitors each proposed ABS action or response to determine if the response calls for pulsing the ABS 72 at one of the stored vehicle natural frequencies to be avoided. If the proposed response does not call for pulsing at one of these natural frequencies, then the ABS response is executed in the normal manner. However, if the proposed response calls for pulsing at one of the natural frequencies to be avoided, then the program instructs the ABS to modify the proposed response in a manner that will not result in exciting that natural frequency. The exact response modification will depend on the application and current driving conditions, however, by way of example, the modification may consist of either accelerating or delaying the response for a predetermined amount of time. The modification could also consist of changing the proposed brake pulse rate or altering the pressure applied to the brakes 78.

Although the control system can be implemented using many of the existing components of the ABS as described above, it is to be understood that special purpose, dedicated on-board hardware could alternately be employed.

It is to be understood that the specific methods and systems which have been described are merely illustrative of one application of the principle of the invention. Numerous modifications may be made to the method as described without departing from the true spirit and scope of the invention.

What is claimed:

1. In a vehicle having a powertrain and an anti-lock braking system (ABS), a method of controlling the ABS, comprising:
   accumulating responses of the ABS to a series of sudden braking events;
   correlating the ABS responses to one or more natural vibration frequencies of the vehicle; and,
   selecting an ABS response to a brake request based on the correlated ABS responses in order to avoid exciting the powertrain at the one or more natural vibration frequencies, wherein the selecting step includes selecting a nominal ABS response and altering the nominal ABS response by either delaying the nominal ABS response for a selected period of time, or accelerating the nominal ABS response.

2. The method of claim 1, wherein the correlating step includes determining which of the accumulated responses excite the powertrain at the one or more natural vibration frequencies.

3. The method of claim 2, wherein the accumulating step includes storing the ABS responses in a memory onboard the vehicle.

4. The method of claim 1, wherein the correlating step includes determining which of the accumulated ABS responses produces reactive torque in the powertrain at frequencies that are near the one or more natural vibration frequencies.

5. The method of claim 1, wherein when the nominal ABS response is altered by accelerating the nominal ABS response, the nominal ABS response comprises pulsing brakes on the vehicle and altering the rate at which the brakes are pulsed.

6. A method of controlling an anti-lock braking system (ABS) to avoid exciting a natural vibration frequency of a vehicle, comprising:
   determining the response of the ABS to a series of sudden braking events;
   developing a set of vehicle natural vibration frequencies that may be excited by the ABS using the response of the ABS to the series of braking events;
   selecting an ABS response to a driving event requiring actuation of the ABS;
   determining whether the selected ABS response may excite any of the frequencies in the developed set; and
   altering the selected ABS response to avoid exciting any of the frequencies in the developed set.

7. The method of claim 6, wherein the developing step is performed by:
   determining the natural vibration frequencies of the vehicle; and,
   selecting the determined natural vibration frequencies that are excited by the ABS.

8. The method of claim 7, wherein the natural vibration frequencies are selected by correlating the ABS responses with the determined natural vibration frequencies to thereby establish which of the natural vibration frequencies are excited by the ABS responses.

9. The method of claim 6, further comprising the step of storing the response of the ABS to the series of sudden braking events in a memory.

10. The method of claim 6, wherein the altering step includes delaying the execution of the selected ABS response.

11. The method of claim 6, wherein the altering step comprises accelerating the execution of the selected ABS response.

12. The method of claim 6, wherein the altering step comprises altering the rate at which the ABS pulses the brakes of the vehicle.

13. A system for controlling an anti-lock braking system (ABS) to avoid exciting a natural vibration frequency of a vehicle, comprising;
  computer memory having a stored set of ABS responses to past sudden braking events requiring actuation of the vehicle's ABS; and,
  a set of programmed instructions for comparing a proposed ABS response with the ABS responses stored in the memory, wherein the programmed instructions include instructions for accelerating the proposed ABS response, delaying the nominal ABS response for a selected period of time, or altering the rate at which the brakes are pulsed and for altering the proposed response based on the comparison to avoid an ABS response that may excite a vehicle natural vibration frequency.

14. The system of claim 13, including a data input device for transferring vehicle natural vibration frequencies to the memory.

15. A method of controlling an anti-lock braking system (ABS) to avoid exciting a natural vibration frequency of a vehicle, comprising:
  storing responses of the ABS to a series of past sudden braking events that resulted in exciting a vehicle natural vibration frequency,
  monitoring the response of the ABS to a series of braking events, wherein the monitoring step includes accumulating and recording brake pressures and brake pulsing frequencies;
  selecting a proposed ABS response to a driving event requiring actuation of the ADS; and,
  altering the proposed ABS response based on the stored ABS responses to avoid an ABS response that may excite a vehicle natural vibration frequency.

16. The method of claim 15, wherein the ABS responses to the series of past braking events are stored in a memory onboard the vehicle.

17. The method of claim 15, wherein the storing step includes storing a plurality of combinations of brake pressures and braking pulsing frequencies.

18. The method of claim 17, including the step of correlating responses of the ABS to the series of past braking events with natural vibration frequencies of the vehicle.

19. The method of claim 15, wherein altering the proposed ABS response includes increasing the brake pulsing frequency.

* * * * *